3,022,346
PREPARATION OF ALIPHATIC-N-CHLORO-
N-ALKYL-AMIDES
Robert Hügel and Adolfo Pasetti, Milan, Italy, assignors to Montecatini Società Generale per l'Industria Mineraria e Chimica, a corporation of Italy
No Drawing. Filed May 9, 1958, Ser. No. 734,122
Claims priority, application Italy May 17, 1957
12 Claims. (Cl. 260—561)

This invention relates to the preparation of N-halogen-N-alkyl-amides, primarily aliphatic N-chloro-N-alkyl-amides, by halogenating in an organic solvent. It particularly pertains to the preparation of such compounds at high concentrations by introducing the halogen, namely chlorine, into a solution of the N-alkyl-amide in an organic solvent in which both the starting aliphatic N-alkyl-amide and the corresponding N-chlorinated product are soluble.

The N-chlorination of products containing one or more hydrogen atoms which are bound to the nitrogen atom, and can be replaced by chlorine, is usually carried out in aqueous solution. According to such prior methods, the substance to be chlorinated is dissolved in water and chlorine is introduced. The chlorinated product thus precipitated is generally less soluble than the starting substance. The HCl thus formed can be removed together with the water by filtering, or it can previously be neutralized by addition of NaOH, sodium carbonate or bicarbonate, etc. If an attempt is made to prepare N-chloro-N-methylacetamide or N-chloro-N-ethylacetamide from the respective amide by a similar method, no precipitate is obtained. Also, an attempt to separate the chlorinated product by extraction with carbon tetrachloride, chloroform or other solvents yields no result.

Also known is a process for chlorinating molten or solid amides. However, yields of 60%, calculated on the basis of theoretical yield, are obtained.

A specific object of the present invention is a process which can be applied to aliphatic N-alkyl-amides soluble in carbon tetrachloride or in another perhalogenated solvent. This process is primarily based on the solubility of both the starting aliphatic N-alkyl-amide and the respective N-chlorinated product in the solvent used. The aliphatic N-alkyl-amide is dissolved in carbon tetrachloride or in a similar solvent. Sodium bicarbonate or another neutralizing agent is suspended in this solution and chlorine is introduced. The N-chlorinated product formed remains in solution. The hydrochloric acid formed is neutralized by the agent. The inorganic salts and the water formed during the reaction are separated. After fractionation of the solvent, the pure product is obtained. By this method, N-chloro-N-methylacetamide and N-chloro-N-ethylacetamide have been prepared according to the following equations:

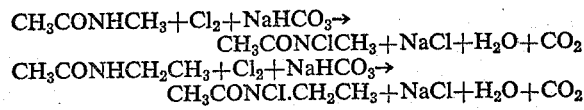

The general reaction scheme is:

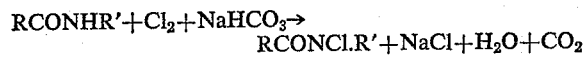

N-chloro-N-methylacetamide is not described in the literature. N-chloro-N-ethylacetamide is apparently mentioned in Beilstein (4, 127) but its published characteristics do not correspond to those found by us. Our product can be distilled under vacuum and is stable, whereas according to the Beilstein citation this substance should be unstable and not distillable.

EXAMPLE 1

The following solution is prepared:

20 g. N-methylacetamide
100 g. carbon tetrachloride 25.3 g. sodium bicarbonate is added and chlorine is introduced while stirring. The mixture is filtered, dried with sodium sulfate and fractionated under vacuum (see below). 26.5 g. N-chloro-N-methylacetamide are obtained, with a yield of 90%.

The product contains 32.8% chlorine (theoretical 32.96%).

Characteristics of N-chloro-N-methylacetamide

Boiling point at 735 mm_____ 129.5°
Boilnig point at 24.5 mm_____ 40.5°
Melting point_____ —24°
Density at 20° C_____ 1.1893
Index of refraction at 16° C_____ 1.4615

EXAMPLE 2

The following solution is prepared:

20 g. N-ethylacetamide
100 g. carbon tetrachloride 21.2 g. sodium bicarbonate are added and chlorine is introduced while stirring. The reaction mixture is filtered, dried with sodium sulfate and fractionated under vacuum (at 67° C., 60 mm. Hg).

25.1 g. N-chloro-N-ethylacetamide are obtained, corresponding to a yield of 90%.

The product contains 29% chlorine (theoretical amount 29.2%).

Characteristics of N-chloro-N-ethylacetamide

By boiling at atmospheric pressure the substance is decomposed:

Boiling point at 50 mm_____° C__ 67
Density at 20° C_____ 1.1263
Index of refraction at 17° C_____ 1.4576

The product of this invention can be used as bleaching agents, as oxidizing agents in neutral or alkaline medium, or as chlorinating agents in acidic medium, or also as disinfectant agents.

We claim:

1. A process for obtaining N-chloro-N-methylacetamide in the pure state and with high yields, comprising dissolving N-methylacteamide in carbon tetrachloride, suspending sodium bicarbonate in the solution and introducing chlorine gas, separating the inorganic salt thus formed, dehydrating the CCl₄ solution and separating the N-chloro-N-methylacetamide by fractional distillation.

2. The process of claim 1, the fractional distillation being by distillation under vacuum.

3. A process for obtaining N-chloro-N-ethylacetamide in the pure state and with high yields, comprising dissolving N-ethylacetamide in carbon tetrachloride, suspending sodium bicarbonate in the solution and introducing chlorine gas, separating the inorganic salt thus formed, dehydrating the CCl₄ solution and separating the N-chloro-N-ethylacetamide by fractional distillation.

4. The process of claim 3, the fractional distillation being by distillation under vacuum.

5. A process for obtaining N-chloro-N-methylacetamide comprising chlorinating N-methylacetamide with chlorine gas in carbon tetrachloride in the presence of a base to neutralize the hydrochloric acid formed in the reaction.

6. A process for obtaining N-chloro-N-ethylacetamide comprising chlorinating N-ethylacetamide with chlorine gas in carbon tetrachloride in the presence of a base to neutralize the hydrochloric acid formed in the reaction.

7. A process for obtaining a compound of the group consisting of N-monochloro-N-methylacetamide and N-monochloro-N-ethylacetamide in substantially pure state and in high yields, comprising dissolving a compound of the group consisting of N-methylacetamide and N-ethylacetamide in carbon tetrachloride, suspending sodium bicarbonate in the solution, and introducing chlorine gas, separating the inorganic salt thus formed, drying the carbon tetrachloride solution and separating the said compound by fractional distillation under vacuum.

8. A process for obtaining a compound of the formula:

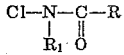

in which $R_1$ is a radical taken from the group consisting of methyl and ethyl and R is a hydrocarbon radical having less than nine carbon atoms, comprising chlorinating the corresponding amide, in which a hydrogen atom is present in place of the chlorine atom of said formula, the chlorinating being with chlorine gas in an organic liquid solvent that is inert in the reaction and dissolves both the said corresponding amide and the compound being obtained, the chlorinating being in the presence of a basic compound that neutralizes the hydrochloric acid produced.

9. A process for obtaining a compound of the formula:

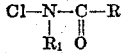

in which $R_1$ is a radical taken from the group consisting of methyl and ethyl and R is a hydrocarbon radical having less than nine carbon atoms, comprising chlorinating the corresponding amide, in which a hydrogen atom is present in place of the chlorine atom of said formula, the chlorinating being with chlorine gas in carbon tetrachloride, the chlorinating being in the presence of a basic compound that neutralizes the hydrochloric acid produced.

10. A process for obtaining a compound of the group consisting of N-monochloro-N-methylacetamide and N-monochloro-N-ethylacetamide, comprising dissolving a substance of the group consisting of N-methylacetamide and N-ethylacetamide in an organic liquid that is inert in the reaction and is a solvent for said substance and said compound being obtained, suspending an alkali carbonate in the solution, and reacting with chlorine gas in the presence of said alkali carbonate, separating the inorganic salt thus formed, dehydrating the organic liquid solution, and separating said compound by fractional distillation under vacuum.

11. A process for obtaining a compound of the group consisting of N-monochloro-N-methylacetamide and N-monochloro-N-ethylacetamide, comprising chlorinating the corresponding amide while dissolved in an organic liquid solvent for said monochloro compound being produced and for said corresponding amide, the solvent being inert in the reaction, the chlorinating being with chlorine gas in the presence of a base that neutralizes the hydrochloric acid produced, separating the inorganic salt thus formed, drying the organic liquid solution, and separating the compound therefrom by fractional distillation under vacuum.

12. A process for obtaining a compound of the group consisting of N-monochloro-N-methylacetamide and N-monochloro-N-ethylacetamide, comprising chlorinating the corresponding amide while dissolved in carbon tetrachloride, the chlorinating being with chlorine gas in the presence of an alkali carbonate as neutralizing agent, separating the inorganic salt formed, drying the carbon tetrachloride solution, and separating the compound therefrom by fractional distillation under vacuum.

References Cited in the file of this patent

Beilstein: Vol 4, page 127 (1922).

Norton: Bulletin de la Societe Chim. de France, Vol. 30, 1878, pages 105–7.

Stieglitz: Berichte Deut. Chem., Vol. 34, 1901, p. 1615.